US008625482B2

(12) United States Patent
Kurokawa

(10) Patent No.: US 8,625,482 B2
(45) Date of Patent: Jan. 7, 2014

(54) WIRELESS COMMUNICATION SYSTEM, WIRELESS ACCESS POINT, COMMUNICATION CONTROL METHOD AND COMPUTER-READABLE MEDIUM

(75) Inventor: Hideki Kurokawa, Tokyo (JP)

(73) Assignee: NEC Infrontia Corporation, Kawasaki, Kanagawa (JP)

( * ) Notice: Subject to any disclaimer, the term of this patent is extended or adjusted under 35 U.S.C. 154(b) by 1472 days.

(21) Appl. No.: 11/822,741

(22) Filed: Jul. 9, 2007

(65) Prior Publication Data

US 2008/0013482 A1 Jan. 17, 2008

(30) Foreign Application Priority Data

Jul. 10, 2006 (JP) ................................. 2006-189342

(51) Int. Cl.
*H04W 4/00* (2009.01)

(52) U.S. Cl.
USPC ........... 370/328; 370/331; 370/353; 455/436; 455/444

(58) Field of Classification Search
USPC ........................ 370/331–353; 455/436–444
See application file for complete search history.

(56) References Cited

U.S. PATENT DOCUMENTS

| | | | | |
|---|---|---|---|---|
| 5,583,996 A | * | 12/1996 | Tsuchiya | 709/218 |
| 6,920,125 B1 | * | 7/2005 | Wu | 370/338 |
| 7,561,895 B1 | * | 7/2009 | Hohnstein et al. | 455/524 |
| 2002/0122410 A1 | * | 9/2002 | Kulikov et al. | 370/349 |
| 2002/0181428 A1 | * | 12/2002 | Kruys | 370/338 |
| 2003/0188006 A1 | * | 10/2003 | Bard | 709/232 |

FOREIGN PATENT DOCUMENTS

| | | |
|---|---|---|
| JP | 2001-237764 | 8/2001 |
| JP | 2002-271245 | 9/2002 |
| JP | 2004-7578 | 1/2004 |

* cited by examiner

*Primary Examiner* — Meless N Zewdu
*Assistant Examiner* — Michael Nguyen
(74) *Attorney, Agent, or Firm* — McGinn IP Law Group, PLLC

(57) ABSTRACT

The traffic of wireless communication between wireless access points can be lowered without requiring a change in the access point to which an associated station belongs, to thereby efficiently use a band for the wireless communication. For this purpose, (1) a station sends a packet, and a wireless access point and a wired access point receives the packet; (2) the wired access point stores an identifier indicating proxy transmission in an ACK packet and then transmits the ACK packet, and (3) the wireless access point confirms the proxy processing identifier of the ACK packet from wired access point and stops delivery of packets to the backhaul. The wired access point delivers the packet to a destination of the packet.

20 Claims, 7 Drawing Sheets

F I G. 6
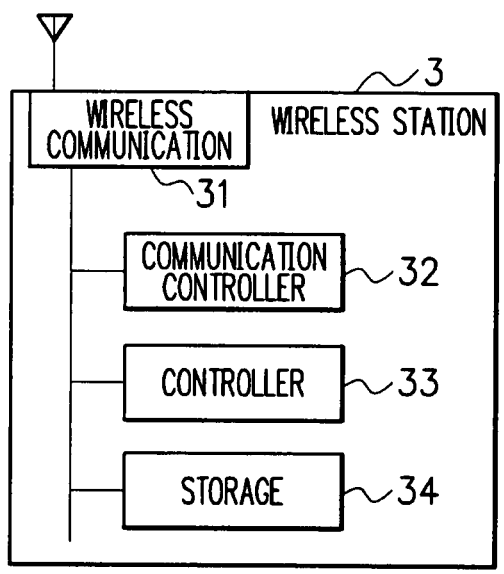

WIRELESS COMMUNICATION SYSTEM, WIRELESS ACCESS POINT, COMMUNICATION CONTROL METHOD AND COMPUTER-READABLE MEDIUM

This application is based upon and claims the benefit of priority from Japanese patent application No. 2006-189342, filed on Jul. 10, 2006, the disclosure of which is incorporated herein in its entirety by reference.

BACKGROUND OF THE INVENTION

1. Field of the Invention

The present invention pertains to a wireless communication system, a wireless access point, a communication control method, and a computer-readable medium storing a communication control program, the system including wireless access points (base station) that communicate with backbone networks only wirelessly and those only through cable.

2. Description of the Related Art

There has been known a mesh network which uses a wireless communication line for a communication path (for example, between access points) up to a connecting point to a backbone network such as a wired Local Area Network (LAN). In the mesh network, an access point (a base station) receives a packet sent from a user. The packet is then relayed to an upper-level network (backhaul).

The wireless communication line adopted as the communication path up to the point connecting to a backbone communication line occupies a frequency band, which is in general shared among a plurality of access points (to be referred to as wireless AP hereinbelow) connected via a wireless communication to the backbone communication line. The user traffic of packets transmitted using wireless communication terminals or stations connected to the respective wireless access points are delivered via the shared wireless communication line to the destinations of the respective packets.

There exists a conventional wireless communication system in which when a station obtains hop count information and cannot directly connect to a wireless access point, an upper-level connection destination, the system selects a second wireless access point having the smallest hop count to thereby connect the station to the wireless access point (see, for example, Japanese Patent Application Laid-Open No. 2001-237764 (document 1)).

In a conventional wireless communication system, there exists an upper-limit value for the frequency band of the wireless communication line employed as the communication path up to the connection point to the backbone communication line. Therefore, the user packets for the stations coupled with the respective wireless access points share the frequency band.

For example, in the example shown in FIG. 1, when a station belonging to a wireless access point 502a transmits a packet to a transmission destination address "192.168.1.0/24", the packet transmitted from the station is wirelessly relayed twice from the access point 502a to be transferred to a wired access point 501b which is in charge of the address "192.168.1.0/24".

The packet is then sent from the wired access point 501b via a wired communication path to the destination.

There also exists a conventional system in which a mobile node measures at least one of the hop count and the communication delay time between the node and a home agent. In the system, if the communication delay time is equal to or more than a predetermined value, the agent to which the mobile node belongs is changed to another agent for which the communication delay time is equal to or less than the predetermined value. Otherwise, if the hop count is equal to or more than a predetermined value, the agent to which the mobile node belongs is altered to another agent for which the hop count is equal to or less than the predetermined value (see, for example, Japanese Patent Application Laid-Open No. 2004-7578 (document 2)).

Referring now to FIG. 2, description will be given of problems in the configuration of the conventional system that changes, according to the hop count, the agent to which the node belongs.

As shown in the example of FIG. 2, when a station belonging to a wireless access point 502a sends a packet to the address "192.168.1.0/24", a hop count becomes smaller if the station belongs to a wired access point 501b in charge of the address "192.168.1.0/24". Therefore, the station first changes an access point to the wired access point 501b and then delivers a data frame to the destination address (communication path A).

Description will now be given of a case in which the destination address is altered to "10.1.1.0/24" as a result of an operation in which, for example, the application to be used by the station is changed. In this situation, it is required to relay three times the data along a route which begins at the wired access point 501b and passes through the wireless AP 502b, the wireless AP 502a, and the wired AP 501a (communication path B) as shown in the example of FIG. 2.

Next, description will be given of problems associated with the conventional techniques.

First, in the wireless communication system of the prior art described by referring to FIG. 1, if the station is apart from the packet destination in the network, the number of relays, i.e., the hop count required to send the packet to an access point (wired AP) that is coupled only by a wired line with the backbone communication line becomes greater. In this case, the band is wasted.

In the technique described in document 1, the station needs processing to attain the hop count information. Also, when a wireless access point wirelessly connected to the backbone communication line receives a packet from a client terminal, the hop count is not zero. Therefore, the traffic is not reduced depending on cases.

In the technique described in document 2, the access point to which the station belongs is changed to reduce the communication delay time or the hop count to a value equal to or less than the predetermined value. Therefore, each time the transmission destination from the mobile node is altered, it is required to change the access point to which the station belongs.

In the example shown in FIG. 2, the problem can be avoided by changing the wireless access point to which the station belongs to the wireless access point 501a in charge of the destination address "10.1.1.0/24". However, for this purpose, each time the transmission destination address is changed by an application, it is required to switch access points to which the station belongs.

This possibly leads to the problems as below.

(1) The processing to change the access point takes a long period of time and brings about a non-communication state or the disconnection of sessions, thereby hindering the communication in some cases.

(2) When an authentication server is employed to conduct authentication, encryption key information is to be communicated as a new access point is chosen. This may increase the traffic.

(3) The band must be newly saved after a new access point is chosen. Therefore, if another station issues a request for belonging to an access point while the access point change processing is under way, a new access point could not be appointed.

SUMMARY OF THE INVENTION

An exemplary object of the invention is to provide a wireless communication system, a wireless access point, a communication control method, and a computer-readable medium storing a communication control program that reduces the traffic between wireless access points and effectively uses the band of wireless communication without requiring the acquisition of information of the hop count from other devices and without requiring the change of the access point to which the station belongs.

A wireless access point according to an exemplary aspect of the invention includes: a wireless receiving module that receives a packet through wireless communication; a judge module that determines whether a wireless transmission path for a transmission of the packet received by the wireless receiving module from the wireless access point to a destination address of the packet is shorter than a wireless transmission path of the packet determined according to the packet; and a transmission control module that transmits the packet to the destination address if the judge module determines that the wireless transmission path from the wireless access point to the destination address of the packet is shorter than the wireless transmission path of the packet determined according to the packet.

A wireless access point according to an exemplary aspect of the invention includes: a wireless receiving module that receives a packet through wireless communication; a judge module that determines whether the wireless access point is nearer on a transmission path to a destination address of a packet received by the wireless receiving module than a wireless access point to which a source unit of the packet belongs; and a transmission control module that transmits the packet to the destination address if the judge module determines that the wireless access point is nearer on a transmission path to the destination address.

A wireless communication system according to an exemplary aspect of the invention includes: a first wireless access point connected via a wired communication line to a backbone communication line; a second wireless access point coupled through wireless communication to the backbone communication line, and the first wireless access point includes a transmission control module that transmits, if a packet sent to an address assigned to the first wireless access point is received from a station belonging to the second wireless access point, the packet to the backbone communication line.

A communication control method according to an exemplary aspect of the invention includes the steps of: receiving by a wireless access point a packet through wireless communication; judging whether a wireless transmission path for transmission from the wireless access point to a destination address of a packet received by the wireless receiving step is shorter than a wireless transmission path of the packet determined according to the packet; and transmitting, if the judging step determines that the wireless transmission path for transmission from the wireless access point to the destination address of the packet is shorter, the packet to the destination address.

A communication control method according to an exemplary aspect of the invention includes the steps of: receiving by a wireless access point a packet through wireless communication; judging whether the wireless access point is nearer on a transmission path to a destination address of a packet received by the wireless receiving step than a wireless access point to which a source unit of the packet belongs; and transmitting the packet to the destination address if the judging step determines that the wireless access point is nearer on a transmission path to the destination address of the packet.

A computer-readable medium storing a communication control program according to an exemplary aspect of the invention causes a wireless access point to perform: wireless receiving processing for receiving a packet through wireless communication; judge processing for determining whether a wireless transmission path for transmission from the wireless access point to a destination address of a packet received by the wireless receiving step is shorter than a wireless transmission path of the packet determined according to the packet; and transmission control processing for transmitting the packet to the destination address if the judge processing determines that the wireless transmission path for transmission from the wireless access point to the destination address of the packet is shorter.

A computer-readable medium storing a communication control program according to an exemplary aspect of the invention causes a wireless access point to perform: wireless receiving processing for receiving a packet through wireless communication; judge processing for determining whether the wireless access point is nearer on a transmission path to a destination address of a packet received by the wireless receiving processing than a wireless access point to which a source unit of the packet belongs; and transmission control processing for transmitting the packet to the destination address if the judge processing determines that the wireless access point is nearer on a transmission path to the destination address of the packet.

BRIEF DESCRIPTION OF THE DRAWINGS

The objects and features of the present invention will become more apparent from the consideration of the following detailed description taken in conjunction with the accompanying drawings in which:

FIG. 6 is a block diagram showing an example of structure of a wireless communication terminal or station 3;

DESCRIPTION OF EXEMPLARY EMBODIMENTS

Referring next to the drawings, description will be given in detail of a wireless communication system, a wireless access point, a communication control method, and a communication control program.

First, an outline of exemplary embodiments will be described.

In a mesh network a wireless communication line is adopted for communication between access points as a communication path up to a connecting point to a backbone communication line such as an LAN.

A client (a wireless communication terminal or a station) sends a packet to a destination, and an access point (a wireless base station) at a point near the destination on the network receives the packet as a proxy device to deliver the packet to the destination. As a result, there is provided a wireless mesh network capable of lowering the traffic on the backhaul.

Next, description will be given of the structure of a wireless communication system.

Figure 1:
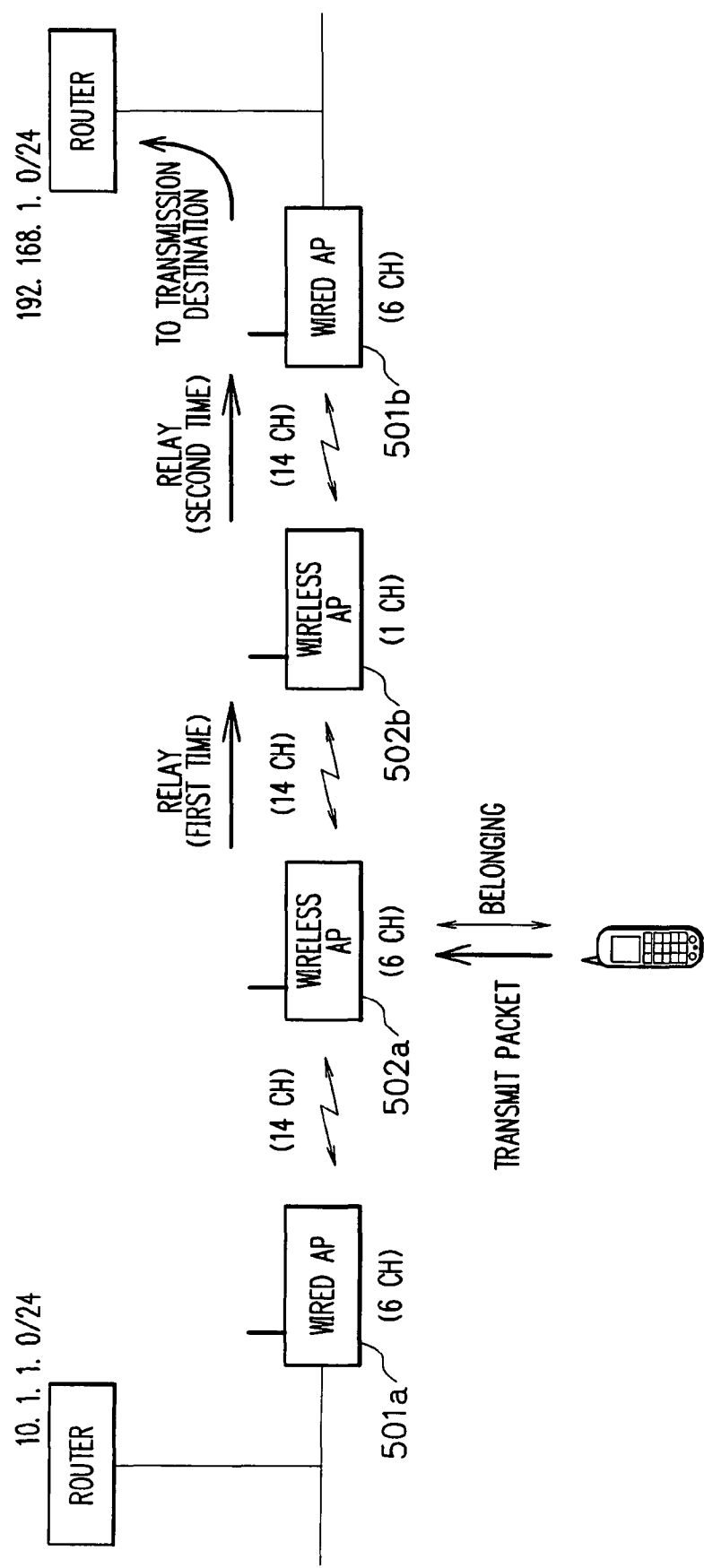
FIG. 1 is a schematic block diagram showing a configuration of a conventional wireless communication system to relay data.
Figure 2:
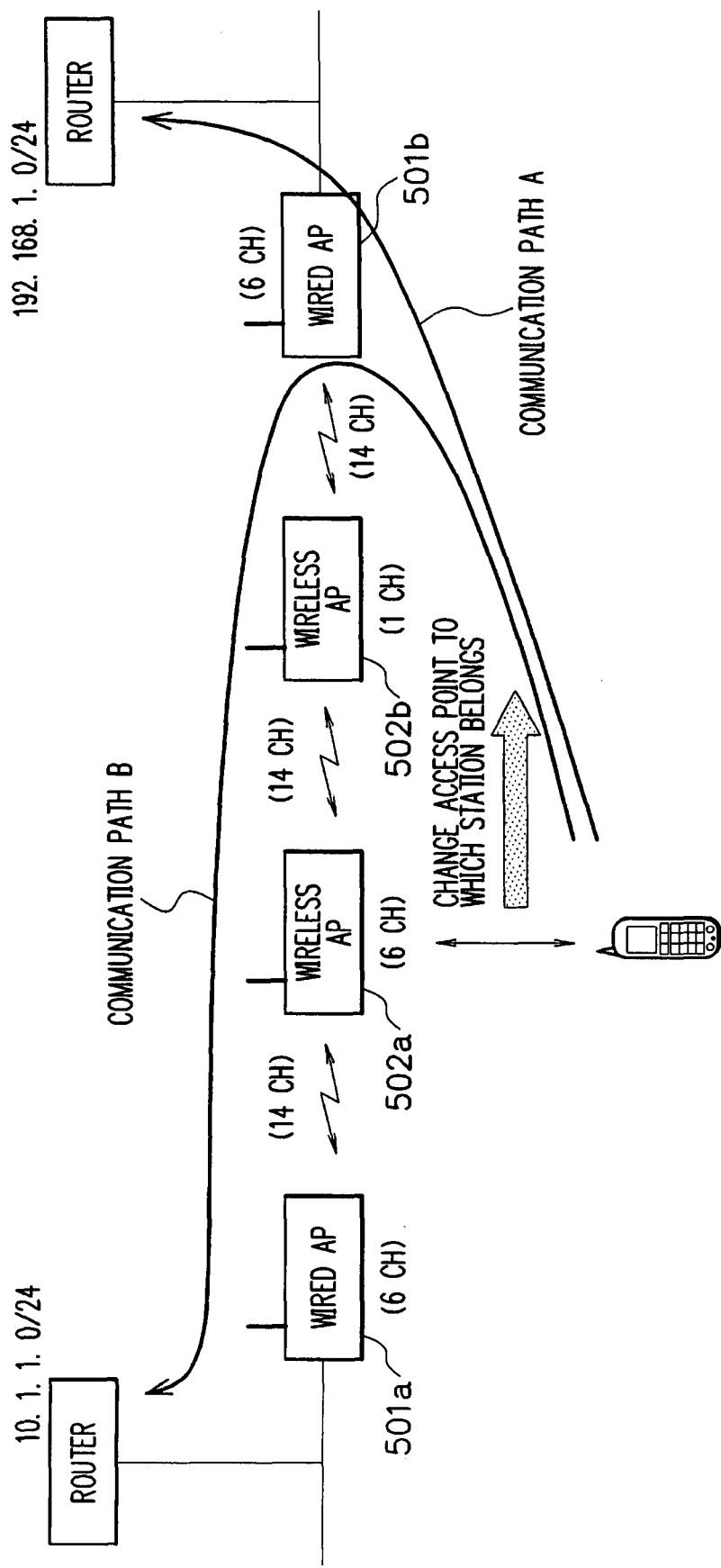
FIG. 2 is a block diagram showing a configuration of a conventional wireless communication system to relay data by use of the access point change.
Figure 3:
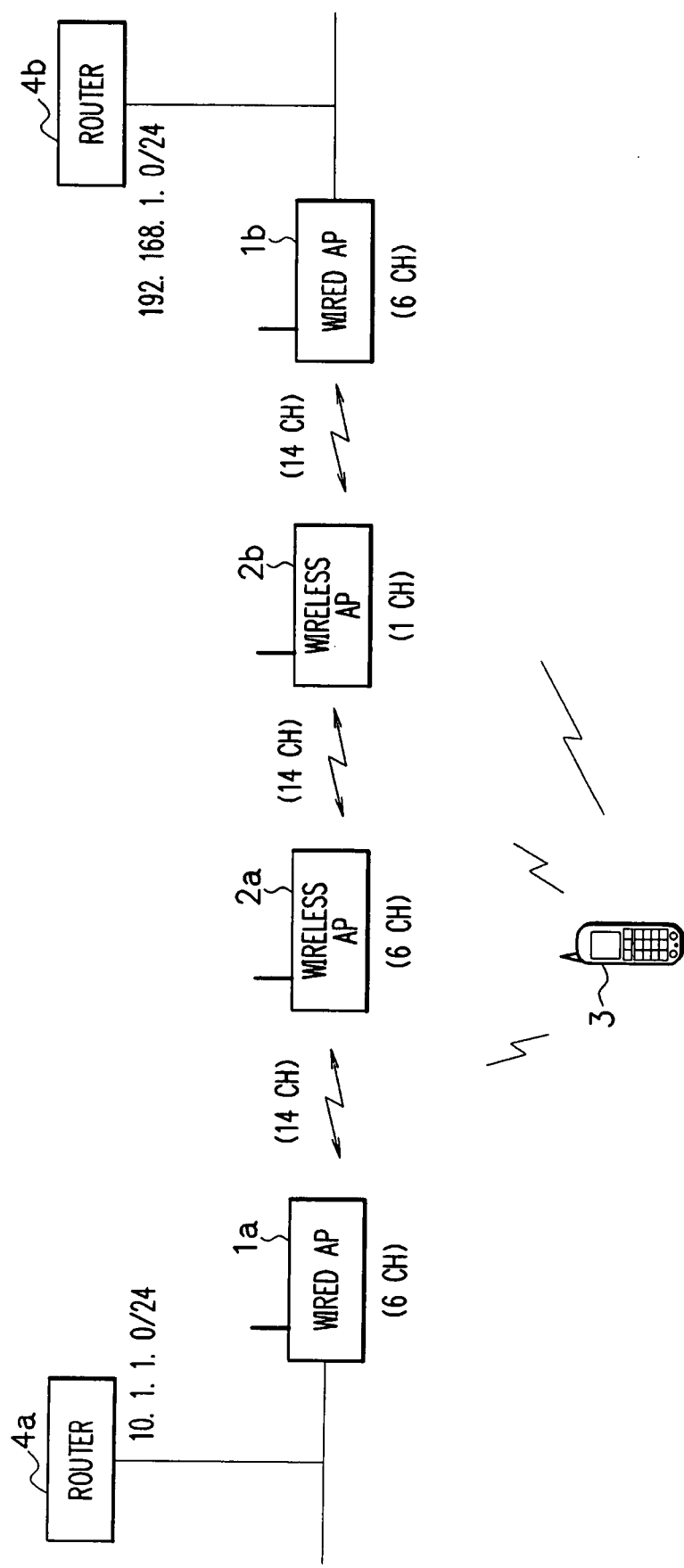
FIG. 3 is a block diagram showing an example of structure of a wireless communication system.

As can be seen from FIG. 3, the communication system includes wired access points 1 (1a, 1b; first base stations) connected only via wired communication lines to a backbone communication line and wireless access points 2 (2a, 2b; second base stations) wirelessly linked with a backbone communication line.

Each wired access point 1 is coupled only by a wired line to a router 4 and is assigned a network address. The access point 1 is in charge of the address in the wireless communication system. The router 4 assigns the network address.

In the example of FIG. 3, a network address "10.1.1.0/24" is assigned to the wired access point 1a, which is then connected to the router 4a. Similarly, a network address "192.168.1.0/24" is assigned to the wired access point 1b, which is then coupled with the router 4b.

The wired access points 1 and the wireless access points 2 are configured to be wirelessly communicable with the station 3 and control the wireless communication of the station 3.

In the example of FIG. 3, the wired access points 1a and 1b and the wireless access point 2a can wirelessly communicate with the station 3 in an infrastructure mode using channel 6.

The wireless access point 2b is wirelessly communicable with the station 3 in an infrastructure mode using channel 1.

In the following description, it is assumed that the wired access points 1a and 1b and the wireless access point 2a are placed at positions with a distance to normally receive packets from the station 3.

The wireless access point 2 (2a, 2b) sends a packet received from the station 3 to the wired access point 1 (1, 1b) by use of a relay line (backhaul) for wireless communication between access points.

In the example shown in FIG. 3, the wireless communication is conducted using the backhaul with a frequency of channel 14. The backhaul is shared among the wired access points 1a and 1b and the wireless access points 2a and 2b.

Figure 4:
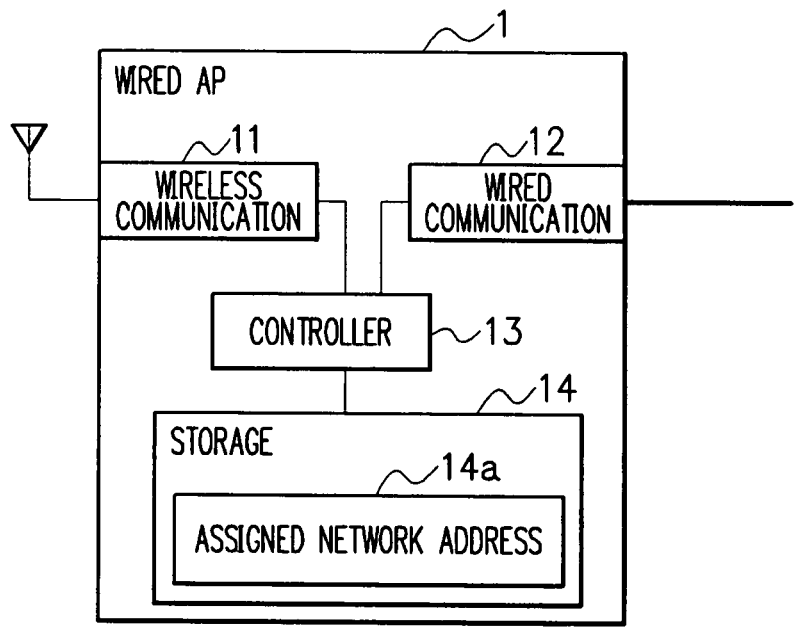
FIG. 4 is a block diagram showing an example of a configuration of a wired access point 1.

As shown in FIG. 4, each wired access point 1 includes a wireless communication module 11 to communicate wirelessly with other units such as the station 3, a wired communication module 12 to communicate via a wired communication line with other units constituting a network such as the router 4, a control module 13 to supervise the overall operation of the wired access point 1, and a storage unit 14 to store data such as a network address (assigned address) 14a assigned to the access point 1.

Figure 5:
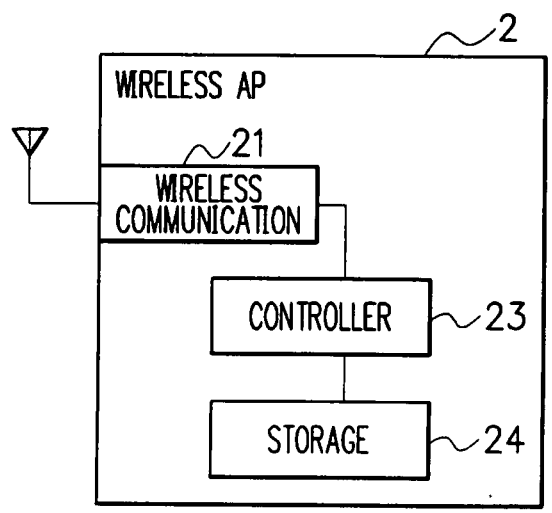
FIG. 5 is a block diagram showing an example of a configuration of a wireless access point 2.

As shown in FIG. 5, each wireless access point 2 includes a wireless communication module 21 to communicate by radio with other units such as the station 3, a control module 23 to control the overall operation of the wireless access point 2, and a storage unit 24.

As shown in FIG. 6, the station 3 includes a wireless communication module 31 to conduct wireless communication with the wired access points 1 and the wireless access points 2, a communication controller 32 to supervise operation such as selection of an access point to which the station 3 belongs, a control module 33 to control the overall operation of the station 3, and a storage unit 34.

Description will now be given of operation conducted in the wireless communication system.

The processing is carried out according to the following procedure.

(1) The station 3 transmits a packet. The wireless AP 2a and the wired AP 1b receive the packet.

(2) The wired AP 1b stores an identifier indicating proxy transmission (proxy processing) in an Acknowledge (ACK) packet and transmits the packet.

(3) The wireless AP 2a confirms the proxy processing identifier in the ACK packet from the wired AP 1b and then stops the delivery of packets to the backhaul. The wired AP 1b delivers the packet to the destination of the packet.

Figure 7:
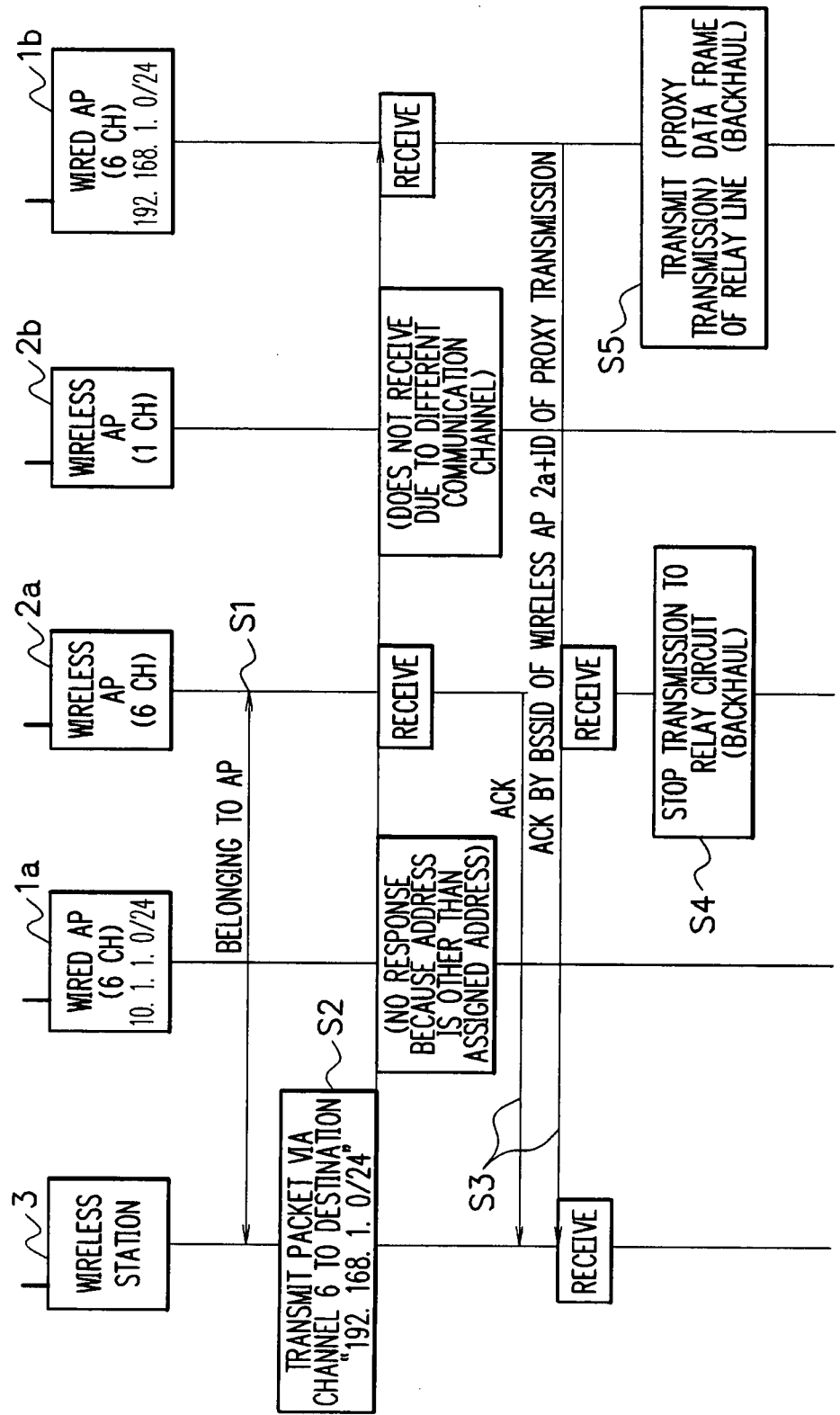
FIG. 7 is a sequence chart showing operation steps in the wireless communication system.

Referring next to the flowchart of FIG. 7, description will be given of operation conducted in the wireless communication system.

Assume that the station 3 belongs to the wireless AP 2a through the operation, for example, by issuing a belonging request to belong to the wireless AP 2a (step S1).

Assume in this situation that the user, for example, changes the application for the station 3 and hence the transmission destination address is altered. In the example of FIG. 7, the address is changed to "192.168.1.0/24" and the station 3 transmits a packet to the address (step S2).

Assume that as a result of the packet transmission, the wired access points 1a and 1b and the wireless access point 2a using the same service channel for the wireless communication with the station have normally received the packet. The wireless access point 2b using another communication channel does not receive the packet even if the station 3 is in a radio wave receiving zone.

In step S2, the packet is fed to an address assigned to the wired access point 1b. That is, in the example of FIG. 7, the packet is sent to the address "192.168.1.0/24".

Therefore, the wired access point 1a does not respond to the packet sent in step S2 since the assigned address thereof is other than the address "192.168.1.0/24".

Thereafter, the wired access point 1b receives the packet sent from the station 3 in step S2. According to the packet, the wired access point 1b determines and identifies the station 3 as the transmission source. As a result, since the packet has been sent to the assigned address of the access point 1b, the access point 1b determines that the access point 1b is nearer to the transmission destination address on the transmission path than the wireless access point 2a to which the station 3 belongs.

Based on the determination, the access point 1b adds, to the ACK packet associated with a BaSic Service IDentifier (BSSID) of the wireless access point 2a, an identifier of proxy transmission indicating that the access point 1b executes proxy transmission processing of the packet, and then transmits the ACK packet to the station 3.

The packet sent from the station 3 in step S2 is also received by the access point 2a to which the station 3 belongs. The access point 2a transmits, as operation in the ordinary reception processing, the ACK packet associated with the BSSID to the station 3 (step S3).

The station 3 receives the ACK packets respectively from the wired access point 1 and the wireless access point 2a and then terminates the packet transmission processing in step S2.

Upon receiving the ACK packet including the proxy transmission identifier from the access point 1b, the wireless access point 2*a* stops the transmission in which the packet sent from the station 3 in step S2 is delivered to the relay line, i.e., the backhaul.

That is, in the ordinary packet reception, the access point 2*a* executes thereafter the transmission processing in which the packet is relayed twice via the wireless access point 2*b* to the wired access point 1*b*. However, in this case, the wireless access point 2*a* stops the radio communication between access points, specifically, from the access point 2*a* to the access point 2*b* (step S4).

After transmitting the ACK packet in step S3, the access point 1*b* executes, as proxy processing, the transmission processing to feed the packet sent from the station 3 in step S2 to the backhaul (step S5).

As above, the wired access point 1 serves functions as below.

(1) The access point nearer, in the term of the distance in the network, to the packet transmission destination, i.e., the end point executes proxy processing to receive the packet and then to send the packet to the end point by proxy processing.

(2) The access point 1 transmits the ACK indicating the confirmation of reception by the station 3 and notifies the access point to which the station 3 belongs of the proxy transmission.

The wireless access point 2 includes a function as follows.

(1) At reception of the notification of the proxy transmission of the packet from the station 3, the access point stops the delivery of the packet to the backhaul.

As described above, according to the wireless communication system in which the wired access points 1*a* and 1*b* and the wireless access point 2*a* use, for example, the same user service channel, if the wired access point 1*b* assigned with the address equal to the transmission destination address of the packet also receives a packet from a station 3 belonging to the access point 2*a*, the access point 1*b* conducts proxy processing to receive the packet and then feeds the packet to the end point.

As a result, the packet can be sent to the end point without conducting the packet relay twice, i.e., from the access point 2*a* to the access point 2*b* and then from the access point 2*b* to the access point 1*b*. It is hence possible to reduce the traffic on the backhaul to relay the packet.

Since the wired access point 1*b* transmits the packet as a proxy of the access point 2*a* to which the station belongs, the backhaul traffic can be lowered without requiring the access point change.

There can be obtained advantages as below.

(1) The period of time for the access point change can be dispensed with and hence there does not exist the non-transmission state associated with the access point change. It is hence possible to reduce the backhaul traffic while hindrances against the communication is prevented.

(2) Even when an authentication server, not shown, conducts authentication, the communication of encryption key information associated with the access point change is not required. There hence does not appear the increase in the traffic due to the access change, which also lowers the backhaul traffic.

(3) The operation to assign a band for communication in a new access point as a result of the access point change is not required. Therefore, the backhaul traffic can be reduced. Even if the access point change and a request from another station to change its access point take place at the same time, there is no risk that the access point change cannot be carried out.

Not only the reduction in the backhaul traffic but also the processing delay time for the packet relay can be suppressed.

For a packet sent from a station linked with an access point, a second access point which can receive the packet and which is less apart from an end point of the packet can conduct the proxy transmission. It is therefore possible to avoid the packet relay by the wireless access point to which the station 3 belongs.

As a result, the traffic between the wireless access points is reduced. Therefore, the band of the wireless communication can be efficiently used and the processing delay time due to the packet relay can be shortened.

Exemplary embodiments described above are only favorable embodiments, and the present invention is not restricted by exemplary embodiments.

In the description, the system includes, for example, two wired access points 1 and two wireless access points 2. However, it is possible to employ desired numbers of wired and wireless access points only if a wireless mesh network includes wireless access points coupled wirelessly to the backbone communication line and wireless access points connected by use of wired communication lines to the backbone communication line.

Although the wired and wireless access points are devices mutually separated from each other in the above exemplary embodiments, each access point may act as both a wired access point and a wireless access point so that a device becomes a wired access point or a wireless access point through a change-over operation.

In the description of the embodiments described above, when the wired access point 1*b* receives a packet (step S2) and it is determined that the packet is sent to an address assigned to the access point 1*b*, the proxy reception (step S3) and the proxy transmission (step S5) are carried out. However, the present invention is not restricted by exemplary embodiments.

There may also be employed a configuration in which, for example, the packet source device is identified using the received packet to estimate an ordinary wireless transmission path from the packet source. If it is determined that the wireless transmission path to deliver the packet from the wired access point 1*b* to the destination address is shorter than the ordinary wireless transmission path, the proxy reception and the proxy transmission are employed.

In this situation, the operation of the wired access point is not limited to the proxy reception and the proxy transmission at reception of the packet from the station 3. That is, there may be adopted a configuration in which the wired access point accomplishes the proxy reception and the proxy transmission when a packet is received from an access point.

Figure 8:
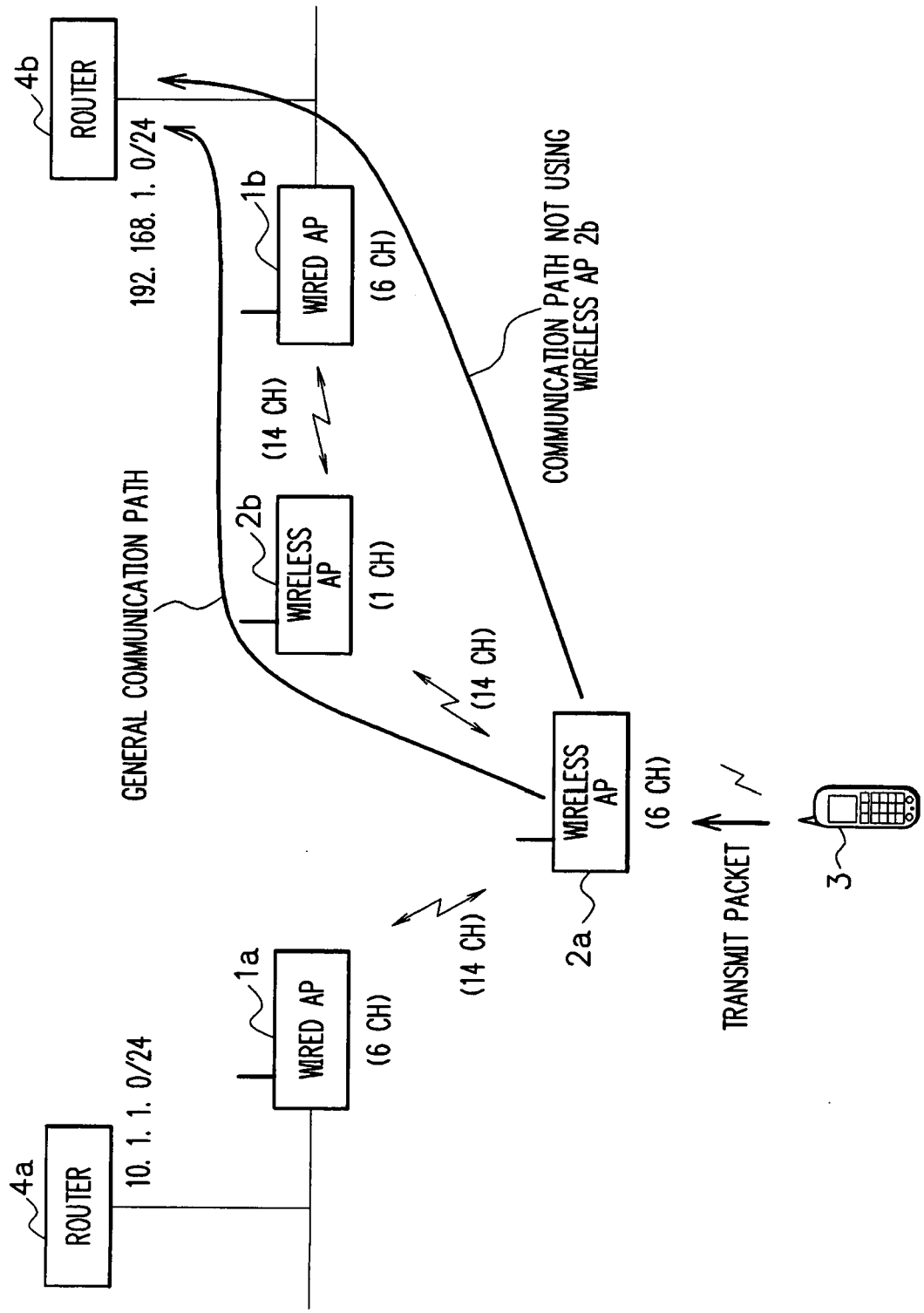
FIG. 8 is a block diagram to explain another example of operation.

Such configuration will be described by referring to an example shown in FIG. 8. Assume that the wired access point 2*a* receives a packet from the station 3 belonging to the wireless access point 2*a* and transmits the packet through relay processing to the wired access point 2*b*, and then the wired access point 1*b* receives the relayed packet addressed to the wired access point 2*b*. In this operation, the present invention is similarly applicable even the system is configured such that the wired access point 1*b* executes, in place of the wireless access point 2*b*, the proxy reception and the proxy transmission, that is, in a configuration in which the general communication path of FIG. 8 is not used, but there is adopted a communication path not including the wireless access point 2*b*.

In the description, the wired access point 1 is connected via a wired communication line to the backbone communication line such as a wired LAN. However, the present invention is not restricted by the embodiments only if the system includes a communication line having a communication capacity sufficiently dealing with the wireless communication band between the wireless access points. The present invention is similarly applicable to a configuration in which the wired access points 1 are connected via large-capacity wireless communication lines to the backbone network.

The processing procedure may be recorded as a program in a computer-readable medium. According to the program supplied from the medium, the functions of each exemplary embodiment are implemented by executing the program by a Central Processing Unit (CPU) of a computer constituting the system.

In the situation, the present invention is also applicable by supplying a group of information items including the program to an output device via the computer-readable medium or via a network from an external recording medium.

That is, the program code obtained from the medium implements novel functions of the present invention. The medium having recorded the program code and signals read from the medium are also included in the scope of the present invention.

The recoding medium may be, for example, a floppy (registered trademark) disk, a hard disk, an optical disk, a magnetooptical disk, a Compact-Disk Read-Only Memory (CD-ROM), a CD-R, a magnetic tape, a nonvolatile memory card, an ROM, or an Electrically Erasable Programmable ROM (EEPROM).

By use of the program in accordance with the present invention, the respective functions of the wireless communication system can be implemented by a wireless communication system supervised by the program.

Second Exemplary Embodiment

The wireless access point may be connected via a wired communication line to a backbone communication line and be coupled wirelessly to a second wireless access point linked via wireless communication to the backbone communication line. If the wireless receiving module receives a packet sent from a station belonging to the second wireless access point to an address assigned to the wireless access point, the judge module determines whether the wireless transmission path for transmission from the wireless access point to the destination address of the packet is shorter than a wireless transmission path for transmission of the packet via the second wireless access point to the destination address. The transmission control module favorably transmits the packet to the backbone communication line according to a determination by the judge module.

Third Exemplary Embodiment

The wireless access point may include a transmission notifying module that notifies, if the judge module determines that the wireless transmission path for transmission from the wireless access point to the destination address of the packet is shorter, an event that the wireless access point sends the packet to the destination address to other wireless access points on the wireless transmission path determined according to the packet.

Fourth Exemplary Embodiment

The information notified by the transmission notifying module may include a reception confirmation packet for the packet received by the wireless receiving module and an identifier indicating that the transmission control module conducts the transmission.

Fifth Exemplary Embodiment

The wireless access point may be coupled through wireless communication with a first wireless access point connected to a backbone communication line. The wireless access point may further include a transmission stop module that stops, if a packet from a station belonging to the wireless access point is received and a notification to send the packet to the backbone communication line is received from the first wireless access point, transmission of the packet through wireless communication to other wireless access points.

Sixth Exemplary Embodiment

The source unit may be a station and the wireless access point may be connected via a wired communication line to a backbone communication line and coupled by wireless to a second wireless access point linked via wireless communication to the backbone communication line. If the wireless receiving module receives a packet sent from a station belonging to the second wireless access point to an address assigned to the wireless access point, the judge module determines whether the wireless access point is nearer to the destination address than the second wireless access point. The transmission control module favorably transmits the packet to the backbone communication line according to a determination by the judge module.

Seventh Exemplary Embodiment

The wireless access point may include a transmission notifying module that notifies, if the judge module determines that the wireless access point is nearer on a transmission path to the destination address, an event that the wireless access point sends the packet to the destination address to the wireless access points to which the source unit belongs.

Eighth Exemplary Embodiment

It is favorable that the information notified by the transmission notifying module including a reception confirmation packet for the packet received by the wireless receiving module and an identifier indicating that the transmission control module conducts the transmission.

Ninth Exemplary Embodiment

The reception confirmation packet may be transmitted as a packet from a wireless access point to which the source unit of the packet received by the wireless receiving module belongs.

Tenth Exemplary Embodiment

The source unit may include a station and the wireless access point may be coupled through wireless communication with a first wireless access point connected to a backbone communication line. The wireless access point may further include a transmission stop module for stopping, if a packet from a station belonging to the wireless access point is received and a notification to send the packet to the backbone communication line is received from the first wireless access point, transmission of the packet through wireless communication to other wireless access points.

Eleventh Exemplary Embodiment

In the wireless communication system, the first wireless access point may include a transmission notifying module that notifies, when the transmission control module transmits the packet to the backbone communication line, an event of the transmission to the second wireless access point.

Twelfth Exemplary Embodiment

The second access point may include a transmission stop module that stops on a basis of the notification, when the notification is received from the transmission notifying module, transmission of the packet sent from the first wireless access point from the second wireless access point to other wireless access points.

Thirteenth Exemplary Embodiment

The notification of the transmission notifying module may include a reception confirmation packet that is sent in response to the packet from the station and that is sent from the second wireless access point to which the station belongs and an identifier indicating that the transmission control means conducts the transmission.

Fourteenth Exemplary Embodiment

In the communication control method, the wireless access point may be connected via a wired communication line to a backbone communication line and coupled wirelessly to a second wireless access point linked via wireless communication to a backbone communication line. If the wireless receiving step receives a packet sent from a station belonging to the second wireless access point to an address assigned to the wireless access point, the judging step determines whether a wireless transmission path to transmit the packet from the wireless access point is shorter than a wireless transmission path to transmit the packet via the second wireless access point to the destination address. The transmitting step desirably transmits the packet to the backbone communication line according to a determination by the judging step.

Fifteenth Exemplary Embodiment

The communication control method may include a transmission notifying step of notifying, if the judging step determines that the wireless transmission path to transmit the packet from the wireless access point is shorter, an event that wireless access point transmits the packet to the destination address to other wireless access points on a wireless transmission path of the packet determined according to the packet received by the wireless receiving step.

Sixteenth Exemplary Embodiment

The information notified by the transmission notifying step may include a reception confirmation packet for the packet received by the wireless receiving step and an identifier indicating that the transmission control step conducts the transmission.

Seventeenth Exemplary Embodiment

In the communication control method, the wireless access point may be coupled through wireless communication with a first wireless access point connected to a backbone communication line. The communication control method may include a transmission stop step of stopping, if a packet from a station belonging to the wireless access point is received and a notification to send the packet to the backbone communication line is received from the first wireless access point, transmission of the packet through wireless communication to other wireless access points.

Eighteenth Exemplary Embodiment

In the communication control method, the source unit may include a station and the wireless access point may be connected via a wired communication line to a backbone communication line and coupled by wireless to a second wireless access point linked via wireless communication to the backbone communication line. If the wireless receiving step receives a packet sent from a station belonging to the second wireless access point to an address assigned to the wireless access point, the judging step determines whether the wireless access point is nearer on a transmission path to the destination address of the packet than the second wireless access point.

Nineteenth Exemplary Embodiment

A transmission control step may transmit the packet to the backbone communication line according to a determination by the judging step.

Twentieth Exemplary Embodiment

The communication control method may include the transmission notifying step of notifying, if the judge step determines that the wireless access point is nearer on a transmission path to the destination address, an event that the wireless access point sends the packet to the destination address to the wireless access point to which the source unit of the packet belongs.

Twenty-First Exemplary Embodiment

The information notified by the transmission notifying step may include a reception confirmation packet for the packet received by the wireless receiving step and an identifier indicating that the transmission control step conducts the transmission.

Twenty-Second Exemplary Embodiment

The reception confirmation packet may be transmitted as a packet from a wireless access point to which the source unit of the packet received by the wireless receiving step belongs.

Twenty-Third Exemplary Embodiment

The source unit may include a station and the wireless access point is coupled through wireless communication with a first wireless access point connected to a backbone communication line. The communication control method desirably includes a transmission stop step for stopping, if a packet from a station belonging to the wireless access point is received and a notification to send the packet to the backbone communication line is received from the first wireless access point, transmission of the packet through wireless communication to other wireless access points.

Twenty-Fourth Exemplary Embodiment

The wireless access point may be connected via a wired communication line to a backbone communication line and coupled by wireless to a second wireless access point linked via wireless communication to the backbone communication line. If the wireless receiving processing receives a packet sent from a station belonging to the second wireless access point to an address assigned to the wireless access point, the judge processing determines whether a wireless transmission path to transmit the packet from the wireless access point is shorter than a wireless transmission path to transmit the packet via the second wireless access point to the destination address. The transmission control processing favorably transmits the packet to the backbone communication line according to a determination by the judge processing.

Twenty-Fifth Exemplary Embodiment

The computer-executable instructions may cause the wireless access point to perform transmission notifying processing for notifying, if the judge processing determines that the wireless transmission path to transmit the packet from the wireless access point is shorter, an event that the wireless access point sends the packet to the destination address to other wireless access points on a wireless transmission path of the packet determined according to the packet received by the wireless receiving processing.

Twenty-Sixth Exemplary Embodiment

The information notified by the transmission notifying processing may include a reception confirmation packet for the packet received by the wireless receiving processing and an identifier indicating that the transmission control processing conducts the transmission.

Twenty-Seventh Exemplary Embodiment

The wireless access point may be coupled through wireless communication with a first wireless access point connected to a backbone communication line. The communication control program may cause the wireless access point to perform transmission stop processing for stopping, if a packet from a station belonging to the wireless access point is received and a notification to send the packet to the backbone communication line is received from the first wireless access point, transmission of the packet through wireless communication to other wireless access points.

Twenty-Eighth Exemplary Embodiment

The source unit may include a station and the wireless access point may be connected via a wired communication line to a backbone communication line and coupled by wireless to a second wireless access point linked via wireless communication to the backbone communication line. If the wireless receiving processing receives a packet sent from a station belonging to the second wireless access point to an address assigned to the wireless access point, the judge processing determines whether the wireless access point is nearer on a transmission path to the destination address of the packet than the second wireless access point. The transmission control processing favorably transmits the packet to the backbone communication line according to a determination by the judge processing.

Twenty-Ninth Exemplary Embodiment

It is favorable that the computer-executable instructions cause the wireless access point to perform the transmission notifying processing for notifying, if the judge processing determines that the wireless access point is nearer on a transmission path to the destination address, an event that the wireless access point sends the packet to the destination address to the wireless access point to which the source unit of the packet belongs.

Thirtieth Exemplary Embodiment

The information notified by the transmission notifying processing may include a reception confirmation packet for the packet received by the wireless receiving processing and an identifier indicating that the transmission control processing conducts the transmission.

Thirty-First Exemplary Embodiment

The reception confirmation packet may be transmitted as a packet from a wireless access point to which the source unit of the packet received by the wireless receiving processing belongs.

Thirty-Second Exemplary Embodiment

The source unit may include a station and the wireless access point may be coupled through wireless communication with a first wireless access point connected to a backbone communication line. The program may also cause the wireless access point to perform transmission stop processing for stopping, if a packet from a station belonging to the wireless access point is received and a notification to send the packet to the backbone communication line is received from the first wireless access point, transmission of the packet through wireless communication to other wireless access points.

An exemplary advantage according to the invention is that the traffic of wireless communication between wireless access points can be reduced without changing the access point to which the station belongs, and hence the band for the wireless communication can be efficiently used.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless access point, comprising:
   a wireless receiving unit that receives a packet through wireless communication;
   a judge unit that determines whether a first wireless transmission path for a transmission of said packet that is received by the wireless receiving unit from a second wireless access point to a destination address of the packet is shorter than a second wireless transmission path of the packet that is determined according to the packet;
   a transmission control unit that transmits the packet to the destination address, without changing an access point to which a station belongs when the judge unit determines that the first wireless transmission path from the wireless access point to the destination address of the packet is shorter than the second wireless transmission path of the packet determined according to the packet; and
   a transmission notifying unit that notifies, when the judge unit determines that the first wireless transmission path for transmission from the wireless access point to the destination address of the packet is shorter, of an event that the wireless access point sends the packet to the destination address to other wireless access points on the second wireless transmission path determined according to the packet, wherein information notified by the transmission notifying unit includes a reception confirmation packet for the packet received by the wireless receiving unit and an identifier indicating that the transmission control unit conducts the transmission, wherein the wireless access point is coupled through wireless communication with a third wireless access point, said third wireless access point being connected to a first backbone communication line, and wherein the wireless access point further comprises a transmission stop unit that terminates the transmission of the packet through the wireless communication to the other wireless access points when the packet is received from a respective station belonging to the second wireless access point and a notification to send the packet to the first backbone communication line is received from the third wireless access point.

2. The wireless access point in accordance with claim 1, wherein:

the wireless access point is connected via a wired communication line to said first backbone communication line and is coupled wirelessly to a fourth wireless access point linked via wireless communication to a second backbone communication line;

when the wireless receiving unit receives a second packet sent from a second station belonging to the fourth wireless access point to an address assigned to the wireless access point, the judge unit determines that the first wireless transmission path for transmission from the wireless access point to the destination address of the packet is shorter than a third wireless transmission path for a transmission of the packet via the fourth wireless access point to the destination address; and the transmission control unit transmits the packet to a respective one of the first backbone communication line and the second backbone communication line according to the determination by the judge unit.

3. A wireless access point, comprising:

a wireless receiving unit that receives a packet through wireless communication;

a judge unit that determines whether the wireless access point is nearer on a transmission path to a destination address of said packet that is received by the wireless receiving unit than a second wireless access point to which a source unit of the packet belongs;

a transmission control unit that transmits the packet to the destination address, without changing an access point to which a first station belongs when the judge unit determines that the wireless access point is nearer on the transmission path to the destination address; and a transmission notifying unit that notifies, when the judge unit determines that the wireless access point is nearer on said transmission path to the destination address, of an event that the wireless access point sends the packet to the destination address to the second wireless access point to which the source unit belongs, wherein information notified by the transmission notifying unit includes a reception confirmation packet for the packet received by the wireless receiving unit and an identifier indicating that the transmission control unit conducted the transmission, wherein the wireless access point is coupled through wireless communication with a third wireless access point connected to a first backbone communication line, and wherein the wireless access point further comprises a transmission stop unit that stops a transmission of the packet through wireless communication to the other wireless access points when the packet is received from a second station belonging to the wireless access point and a notification to send the packet to the first backbone communication line is received from the third wireless access point.

4. The wireless access point in accordance with claim 3, wherein:

the source unit comprises said first station;

the wireless access point is connected via a wired communication line to said first backbone communication line and is coupled wirelessly to a fourth wireless access point linked via wireless communication to a second backbone communication line;

when the wireless receiving unit receives a second packet that is sent from a third station belonging to the fourth wireless access point to an address assigned to the wireless access point, the judge unit determines that the wireless access point is nearer to the destination address than the fourth wireless access point; and the transmission control unit transmits the packet to a respective backbone communication line according to a determination by the judge unit.

5. The wireless access point in accordance with claim 3, wherein the reception confirmation packet is transmitted as third packet from a fifth wireless access point to which the source unit of the third packet received by the wireless receiving unit belongs.

6. A wireless communication system, comprising:

a first wireless access point connected via a wired communication line to a first backbone communication line; and a second wireless access point coupled through wireless communication to a second backbone communication line, wherein the first wireless access point comprises a transmission control unit that transmits a packet to the first backbone communication line without changing an access point to which a first station belongs when the, a packet is sent to an address that is assigned to the first wireless access point is received from a second station belonging to the second wireless access point, wherein the first wireless access point further comprises a transmission notifying unit that notifies, when the transmission control unit transmits the packet to the second backbone communication line, of an event of the transmission to the second wireless access point, wherein the notification of the transmission notifying unit includes a reception confirmation packet that is sent in response to the packet from the first station and is sent from the second wireless access point to which the second station belongs and an identifier indicating that the transmission control unit conducted the transmission, and wherein the second wireless access point comprises a transmission stop unit that stops the transmission to other wireless access points of the packet sent from the first wireless access point to the second wireless access point when the packet is received from the second station, on a basis of the notification, when the notification is received from the transmission notifying unit.

7. A communication control method, said method comprising:
- receiving, by a first wireless access point, a packet through wireless communication;
- determining whether a first wireless transmission path for transmission from the first wireless access point to a destination address of said packet received by the receiving is shorter than a second wireless transmission path of the packet determined according to the packet;
- transmitting, without changing an access point to which a station belongs, when the determining determines that the first wireless transmission path for a transmission from the first wireless access point to the destination address of the packet is shorter, the packet to the destination address; and
- notifying, when the determining determines that the first wireless transmission path to transmit the packet from the first wireless access point is shorter, of an event that the first wireless access point transmitted the packet to the destination address to other wireless access points on the second wireless transmission path of the packet determined according to the packet received by the receiving,
- wherein information notified by the notifying includes a reception confirmation packet for the packet received by the receiving and an identifier indicating that the transmitting conducted the transmission,
- wherein the first wireless access point is coupled through wireless communication with a second wireless access point, said second wireless access point being connected to a first backbone communication line, and
- wherein the communication control method further comprises stopping a transmission of the packet through the wireless communication to the other wireless access points when the packet is received from a second station belonging to the first wireless access point and a notification to send the packet to the first backbone communication line is received from the second wireless access point.

8. The communication control method in accordance with claim 7, wherein:
- the first wireless access point is connected via a wired communication line to the first backbone communication line and is coupled wirelessly to a third wireless access point linked via wireless communication to a second backbone communication line;
- when the receiving receives a second packet sent from a third station belonging to the third wireless access point to an address assigned to the first wireless access point, the determining determines that the first wireless transmission path to transmit the packet from the wireless access point is shorter than a third wireless transmission path to transmit the packet via the third wireless access point to the destination address; and
- the transmitting transmits the packet to a respective one of the first backbone communication line and the second backbone communication line according to a determination by the determining.

9. A communication control method, said method comprising:
- receiving by a first wireless access point a packet through wireless communication;
- determining whether or not the first wireless access point is nearer on a transmission path to a destination address of said packet received by the receiving than a second wireless access point to which a source unit of the packet belongs;
- transmitting the packet to the destination address without changing an access point to which a station belongs when the determining determines that the first wireless access point is nearer on the transmission path to the destination address of the packet; and
- notifying, when the determining determines that the first wireless access point is nearer on said transmission path to the destination address, of an event that the first wireless access point sent the packet to the destination address to the second wireless access point to which the source unit of the packet belongs,
- wherein the information notified by notifying includes a reception confirmation packet for the packet received by the receiving and an identifier indicating that the transmitting conducted the transmission,
- wherein the first wireless access point is coupled through wireless communication with a third wireless access point connected to a first backbone communication line, and
- wherein the method further comprises stopping the transmission of the packet through wireless communication to the other wireless access points when a packet from said station belonging to the first wireless access point is received and a notification to send the packet to the first backbone communication line is received from the third wireless access point.

10. The communication control method in accordance with claim 9, wherein:
- the source unit comprises said station;
- the first wireless access point is connected via a wired communication line to said first backbone communication line and is coupled wirelessly to a fourth wireless access point linked via wireless communication to a second backbone communication line;
- when the receiving receives a second packet sent from a second station belonging to the fourth wireless access point to an address assigned to the first wireless access point, the determining determines that the first wireless access point is nearer on the transmission path to the destination address of the packet than the fourth wireless access point; and
- the packet is transmitted to a respective one the first backbone communication line and the second backbone communication line according to the determining.

11. The communication control method in accordance with claim 9, wherein the reception confirmation packet is transmitted as a third packet from the second wireless access point to which the source unit of the packet received by the receiving belongs.

12. A non-transitory tangible signal-bearing machine readable storage medium tangibly embodying a program of machine-readable instructions executable by a digital processing apparatus to perform a method of wireless communication, said method comprising:
- receiving a packet through wireless communication;
- determining whether a first wireless transmission path for transmission from a first wireless access point to a destination address of said packet that is received by the receiving is shorter than a second wireless transmission path of the packet determined according to the packet;
- transmitting the packet to the destination address, without changing an access point to which a station belongs when the determining determines that the first wireless transmission path for transmission from the first wireless access point to the destination address of the packet is shorter;

notifying, when the determining determines that the first wireless transmission path to transmit the packet from the first wireless access point is shorter, of an event that first wireless access point sends the packet to the destination address to other wireless access points on the second wireless transmission path of the packet determined according to the packet received by the receiving, wherein information notified by notifying includes a reception confirmation packet for the packet received by the receiving and an identifier indicating that the transmitting conducted the transmission, wherein the first wireless access point is coupled through wireless communication to a second wireless access point to a first backbone communication line, and wherein the method further comprises stopping a transmission of the packet through wireless communication to the other wireless access points when said packet from said station belonging to the first wireless access point is received and a notification to send the packet to the backbone communication line is received from the second wireless access point.

13. A non-transitory storage medium according to claim 12, wherein:

the first wireless access point is connected via a wired communication line to said first backbone communication line and is coupled wirelessly to a third wireless access point linked via wireless communication to a second backbone communication line;

when the receiving receives a second packet sent from a second station belonging to the third wireless access point to an address assigned to the first wireless access point, the determining determines that the first wireless transmission path to transmit the packet from the first wireless access point is shorter than a third wireless transmission path to transmit the packet via the third wireless access point to the destination address; and the packet is transmitted to a respective one of the first backbone communication line and the second backbone communication line according to the determining.

14. A non-transitory tangible signal-bearing machine readable storage medium tangibly embodying a program of machine-readable instructions executable by a digital processing apparatus to perform a method of wireless communication, the method comprising:

receiving a packet through wireless communication;

determining whether or not a first wireless access point is nearer on a first transmission path to a destination address of said packet that is received by the receiving than a second wireless access point to which a source unit of the packet belongs;

transmitting the packet to the destination address, without changing an access point to which a station belongs when the determining determines that the first wireless access point is nearer on said first transmission path to the destination address of the packet;

notifying, when the determining determines that the first wireless access point is nearer on said second transmission path to the destination address, of an event that the first wireless access point sends the packet to the destination address to the second wireless access point to which the source unit of the packet belongs, the first wireless access point is coupled through wireless communication with a third wireless access point connected to a backbone communication line, wherein the method further comprises stopping, if a packet from a station belonging to the first wireless access point is received and a notification to send the packet to the first backbone communication line is received from the third wireless access point, a transmission of the packet through wireless communication to other wireless access points, and wherein the information notified by the transmitting includes a reception confirmation packet for the packet received by the receiving and an identifier indicating that the transmitting conducted the transmission.

15. A non-transitory storage medium according to claim 14, wherein:

the source unit comprises said first station;

the first wireless access point is connected via a wired communication line to the first backbone communication line and is coupled by wireless communication to a fourth wireless access point linked via wireless communication to a second backbone communication line;

when the receiving receives said packet sent from a second station belonging to the fourth wireless access point to an address assigned to the wireless access point, the determining determines that the wireless access point is nearer on the transmission path to the destination address of the packet than the fourth wireless access point; and the packet is transmitted to the backbone communication line according to the determining.

16. A non-transitory storage medium according to claim 14, wherein the reception confirmation packet is transmitted as a second packet from the second wireless access point to which the source unit of the packet received by the receiving belongs.

17. A wireless access point, comprising:

wireless receiving means for receiving a packet through wireless communication;

judge means for determining whether a first wireless transmission path for transmission of said packet received by the wireless receiving means from the wireless access point to a destination address of the packet is shorter than a second wireless transmission path of the packet determined according to the packet;

transmission control means for transmitting the packet to the destination address, without changing an access point to which a station belongs when the judge means determines that the first wireless transmission path from the wireless access point to the destination address of the packet is shorter than the second wireless transmission path of the packet determined according to the packet; and transmission notifying means that notifies, when the judge means determines that the first wireless transmission path for transmission from the wireless access point to the destination address of the packet is shorter, of an event that the wireless access point sends the packet to the destination address to other wireless access points on the second wireless transmission path determined according to the packet, wherein the information notified by the transmission notifying means includes a reception confirmation packet for the packet received by the wireless receiving means and an identifier indicating that the transmission control means conducts the transmission, wherein the wireless access point is coupled through wireless communication with a second wireless access point, said second wireless access point being connected to a first backbone communication line, and wherein the wireless access point further comprises a transmission stop unit that terminates the transmission of the packet through the wireless communication to the other wireless access points when said packet from said station belonging to the wireless access point is received and a notification to send the packet to the first backbone communication line is received from the second wireless access point.

18. A wireless access point, comprising:

wireless receiving means for receiving a packet through wireless communication;

judge means for determining whether the wireless access point is nearer on a first transmission path to a destination address of said packet received by the wireless receiving means than a second wireless access point to which a source unit of the packet belongs;

transmission control means for transmitting the packet to the destination address, without changing an access point to which a station belongs when the judge means determines that the wireless access point is nearer on a first transmission path to the destination address; and a transmission notifying means that notifies, when the judge means determines that the first wireless transmission path for transmission from the wireless access point to the destination address of the packet is shorter, of an event that the wireless access point sends the packet to the destination address to other wireless access points on the wireless transmission path determined according to the packet, wherein information notified by the transmission notifying means includes a reception confirmation packet for the packet received by the wireless receiving means and an identifier indicating that the transmission control means conducts the transmission, wherein the wireless access point is coupled through wireless communication with a third wireless access point, said third wireless access point being connected to a first backbone communication line, wherein the wireless access point further comprises a transmission stop unit that terminates the transmission of the packet through the wireless communication to the other wireless access points when another packet from said station belonging to the wireless access point is received and a notification to send the packet to the backbone communication line is received from the third wireless access point.

19. A wireless communication system, comprising:

a first wireless access point connected via a wired communication line to a first backbone communication line;

a second wireless access point coupled through wireless communication to a second backbone communication line, wherein the first wireless access point comprises transmission control means for transmitting, without changing an access point to which a station belongs when a packet sent to an address assigned to the first wireless access point is received from a second station belonging to the second wireless access point, the packet to the first backbone communication line;

a transmission notifying means that notifies, when judge means determines that a first wireless transmission path for transmission from the first wireless access point to the destination address of the packet is shorter, of an event that the first wireless access point sends the packet to the destination address to other wireless access points on a second wireless transmission path determined according to the packet, wherein the information notified by the transmission notifying means includes a reception confirmation packet for the packet received by the wireless receiving means and an identifier indicating that the transmission control unit conducts the transmission, wherein the wireless access point is coupled through wireless communication with a third wireless access point connected to a backbone communication line, and wherein the first wireless access point further comprises a transmission stop unit that terminates the transmission of the packet through the wireless communication to the other wireless access points when a packet from said station belonging to the first wireless access point is received and a notification to send the packet to first backbone communication line is received from the third wireless access point.

20. The wireless access point in accordance with claim 1, wherein, upon receiving the reception confirmation packet, the transmission control unit stops transmitting the packet through wireless communication from the wireless access point to the other wireless access points.

* * * * *